US012574358B2

(12) United States Patent
Amer et al.

(10) Patent No.: US 12,574,358 B2
(45) Date of Patent: Mar. 10, 2026

(54) SYSTEMS AND METHODS FOR MOBILE-MEDIATED SECURE KEY EXCHANGE FOR GENERAL END-USER CONNECTIVITY

(71) Applicant: JPMORGAN CHASE BANK, N.A., New York, NY (US)

(72) Inventors: Omar Amer, New York, NY (US); Jefferson Chu, Singapore (SG); John S. Combs, Fallston, MD (US); Andrew Lang, Avon, CT (US); Charles Lim, Singapore (SG); Marco Pistoia, Amawalk, NY (US); Vas Rajan, New York, NY (US); Ray Voss, Denton, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 413 days.

(21) Appl. No.: 18/362,595

(22) Filed: Jul. 31, 2023

(65) Prior Publication Data

US 2025/0047651 A1 Feb. 6, 2025

(51) Int. Cl.
| | |
|---|---|
| *H04L 9/40* | (2022.01) |
| *H04L 9/08* | (2006.01) |
| *H04L 9/14* | (2006.01) |

(52) U.S. Cl.
CPC .......... *H04L 63/061* (2013.01); *H04L 9/0819* (2013.01); *H04L 9/0822* (2013.01); (Continued)

(58) Field of Classification Search
CPC ... H04L 63/061; H04L 9/0822; H04L 9/0838; H04L 9/14; H04L 63/0428;
(Continued)

(56) References Cited

U.S. PATENT DOCUMENTS

2013/0173915 A1* 7/2013 Haulund ................. H04L 63/18
 713/155
2014/0230039 A1* 8/2014 Prakash .................. G06F 21/35
 726/9
(Continued)

OTHER PUBLICATIONS

International Search Report and Written Opinion of the International Searching Authority, dated Oct. 28, 2024, from corresponding International Application No. PCT/US2024/040009.

*Primary Examiner* — Shaqueal D Wade-Wright
(74) *Attorney, Agent, or Firm* — GREENBERG TRAURIG LLP

(57) ABSTRACT

A method may include: receiving, by a webserver computer program, shared key material shared with a client application; receiving from a browser, a request for a secure connection; establishing a session with the browser over a first secure connection; establishing a shared secret key with the browser, wherein the browser creates a browser secret key encrypted with the shared secret key, encrypts the browser secret key with the shared secret key, and provides the browser secret key encrypted with the shared secret key and session information the client application over a second secure connection that is protected with the shared key material; decrypting the browser secret key encrypted with the shared secret key using the shared secret key; identifying the session with the browser from the session information; and establishing, end-to-end encryption on top of the second secure connection using the browser secret key or a derivation thereof.

16 Claims, 3 Drawing Sheets

(52) U.S. Cl.
CPC .............. *H04L 9/0838* (2013.01); *H04L 9/14* (2013.01); *H04L 63/0435* (2013.01); *H04L 63/0853* (2013.01); *H04L 63/18* (2013.01); *H04L 63/0428* (2013.01); *H04L 2463/062* (2013.01)

(58) Field of Classification Search
CPC .......... H04L 2463/062; H04L 63/0435; H04L 63/0838; H04L 63/0846; H04L 63/18; H04L 9/0819; H04L 63/0853
See application file for complete search history.

(56) References Cited

U.S. PATENT DOCUMENTS

| | | | |
|---|---|---|---|
| 2016/0308678 A1* | 10/2016 | Bhatnagar ............. | H04L 9/3228 |
| 2017/0048257 A1* | 2/2017 | Hamid .................... | H04L 63/18 |
| 2022/0000048 A1 | 1/2022 | Rosen | |
| 2022/0086134 A1* | 3/2022 | Xie ....................... | H04L 67/141 |
| 2022/0150228 A1* | 5/2022 | Speak ................... | H04L 63/083 |
| 2022/0277063 A1 | 9/2022 | Arroyo et al. | |
| 2022/0360448 A1 | 11/2022 | Sahni | |
| 2024/0089249 A1* | 3/2024 | Richardson ......... | H04L 63/1475 |

* cited by examiner

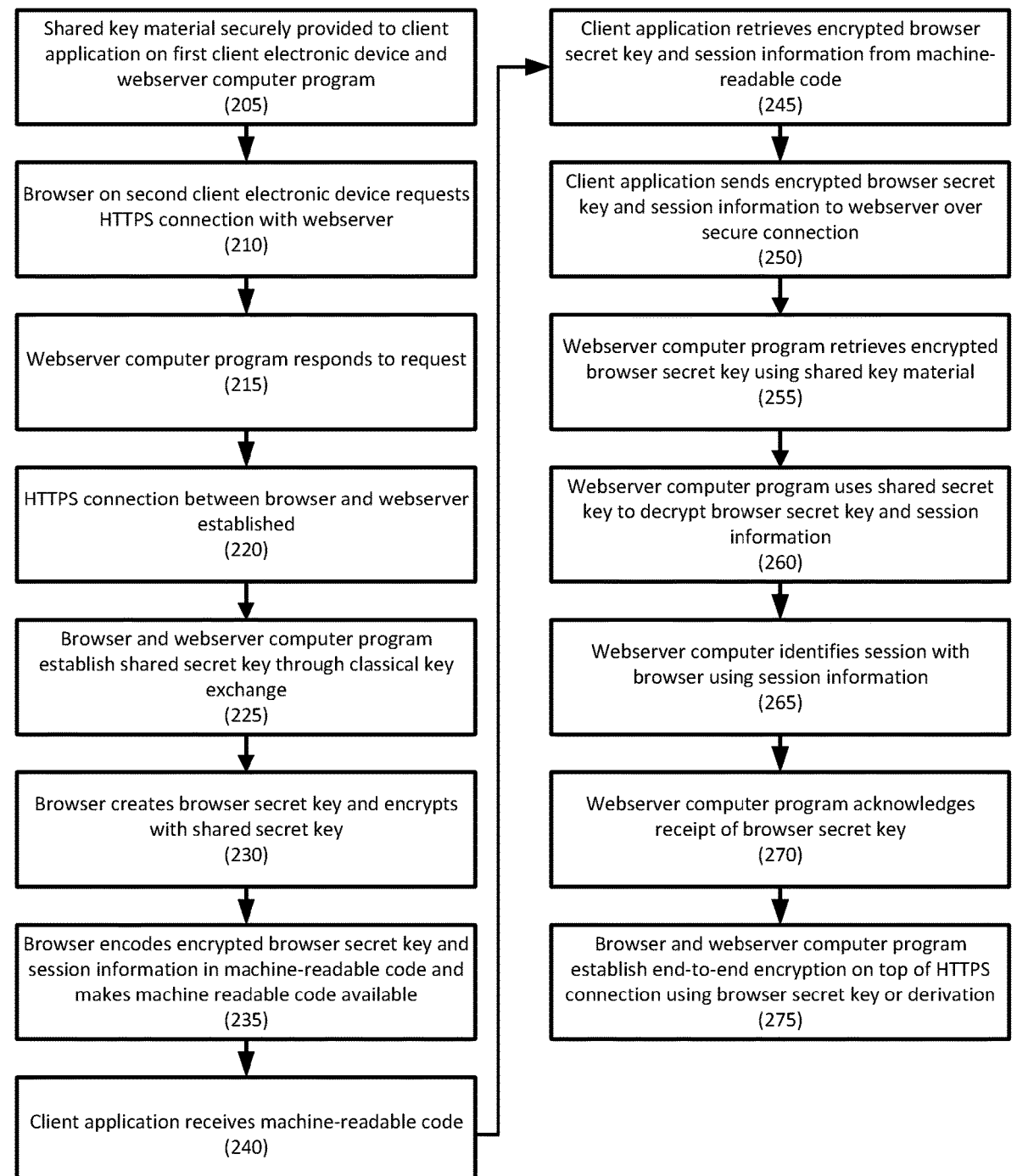

Shared key material securely provided to client application on first client electronic device and webserver computer program
(205)

Browser on second client electronic device requests HTTPS connection with webserver
(210)

Webserver computer program responds to request
(215)

HTTPS connection between browser and webserver established
(220)

Browser and webserver computer program establish shared secret key through classical key exchange
(225)

Browser creates browser secret key and encrypts with shared secret key
(230)

Browser encodes encrypted browser secret key and session information in machine-readable code and makes machine readable code available
(235)

Client application receives machine-readable code
(240)

Client application retrieves encrypted browser secret key and session information from machine-readable code
(245)

Client application sends encrypted browser secret key and session information to webserver over secure connection
(250)

Webserver computer program retrieves encrypted browser secret key using shared key material
(255)

Webserver computer program uses shared secret key to decrypt browser secret key and session information
(260)

Webserver computer identifies session with browser using session information
(265)

Webserver computer program acknowledges receipt of browser secret key
(270)

Browser and webserver computer program establish end-to-end encryption on top of HTTPS connection using browser secret key or derivation
(275)

FIGURE 2

SYSTEMS AND METHODS FOR MOBILE-MEDIATED SECURE KEY EXCHANGE FOR GENERAL END-USER CONNECTIVITY

BACKGROUND OF THE INVENTION

1. Field of the Invention

Embodiments relate to systems and methods for mobile-mediated secure key exchange for general end-user connectivity.

2. Description of the Related Art

Secure connections between an end-user and a remote host are often enabled through some form of public key cryptographic handshake. Such schemes rely on the validity of some sort of computational assumption. With the rise of quantum computing, some of these computational assumptions have been proven false, thereby compromising the security.

SUMMARY OF THE INVENTION

Systems and methods for mobile-mediated secure key exchange for general end-user connectivity are disclosed. In one embodiment, a method for mobile-mediated secure key exchange may include: (1) receiving, by a webserver computer program executed by a remote webserver, shared key material, the shared key material shared with a client application executed by a first client electronic device; (2) receiving, by the webserver computer program and from a browser executed by a second electronic device, a request for a secure connection with the browser; (3) establishing, by the webserver computer program, a session with the browser over a first secure connection; (4) establishing, by the webserver computer program with the browser, a shared secret key, wherein the browser is configured to create a browser secret key encrypted with the shared secret key, encrypt the browser secret key with the shared secret key, and provide the browser secret key encrypted with the shared secret key and session information for the session to the client application over a second secure connection that is protected with the shared key material; (5) decrypting, by the webserver computer program, the browser secret key encrypted with the shared secret key using the shared secret key; (6) identifying, by the webserver computer program, the session with the browser from the session information; and (7) establishing, by the webserver computer program and with the browser, end-to-end encryption on top of the second secure connection using the browser secret key or a derivation thereof.

In one embodiment, wherein the shared secret key may be established through classical key exchange.

In one embodiment, the browser may be configured to encode the encrypted browser secret key in a machine-readable code. The machine-readable code may be communicated optically, by radio frequency communication, or audibly.

In one embodiment, the session information received over the second secure connection may be encrypted with the browser secret key, and the webserver computer program decrypts the session information with the browser secret key.

In one embodiment, the webserver computer program may also receive an indication from the client application that a user of the client application has been authenticated over the second secure connection, and the webserver computer program authenticates the session with the browser without further authentication.

According to another embodiment, a system may include: a first client electronic device executing a client application; a second client electronic device executing a browser; and a remote webserver executing a webserver computer program. The webserver computer program and the client application are configured to receive shared key material, the webserver computer program is configured to receive a request for a secure connection from the browser, the webserver computer program is configured to establish a session with the browser over a first secure connection with the browser, the webserver computer program and the browser are configured to establish a shared secret key, the browser is configured to create a browser secret key encrypted with the shared secret key, the browser is configured to encrypt the browser secret key with the shared secret key, the browser is configured to provide the browser secret key encrypted with the shared secret key and session information for the session to the client application over a second secure connection that is protected with the shared key material, the webserver computer program is configured to decrypt the browser secret key encrypted with the shared secret key using the shared secret key, the webserver computer program is configured to identify the session with the browser from the session information, and the webserver computer program is configured to establish end-to-end encryption with the browser on top of the second secure connection using the browser secret key or a derivation thereof.

In one embodiment, the webserver computer program and the browser may be configured to establish the shared secret key through classical key exchange.

In one embodiment, the browser may be configured to encode the encrypted browser secret key in a machine-readable code.

In one embodiment, the machine-readable code may be communicated optically, by radio frequency communication, or audibly.

In one embodiment, the browser may be configured to encrypt the session information with the browser secret key, and the webserver computer program is configured to decrypt the session information with the browser secret key.

In one embodiment, the client application may be configured to communicate, over the second secure connection, an indication that a user of the client application has been authenticated, and the webserver computer program may be configured to authenticate the session with the browser without further authentication.

According to another embodiment, a non-transitory computer readable storage medium, may include instructions stored thereon, which when read and executed by one or more computer processors, cause the one or more computer processors to perform steps comprising: receiving shared key material, the shared key material shared with a client application executed by a first client electronic device; receiving, from a browser executed by a second electronic device, a request for a secure connection with the browser; establishing a session with the browser over a first secure connection with the browser; establishing, with the browser, a shared secret key; receive, from the client application, a browser secret key encrypted with the shared secret key and session information for the session over a second secure connection that is protected with the shared key material, wherein the browser secret key was encrypted with the shared secret key by the browser; decrypting the browser secret key encrypted with the shared secret key using the shared secret key; identifying the session with the browser from the session information; and establishing, with the browser, end-to-end encryption on top of the second secure connection using the browser secret key or a derivation thereof.

In one embodiment, the shared secret key may be established through classical key exchange.

In one embodiment, the session information received over the second secure connection may be encrypted with the browser secret key, and may also include instructions stored thereon, which when read and executed by one or more computer processors, cause the one or more computer processors to decrypt the session information with the browser secret key.

In one embodiment, the non-transitory computer readable storage medium may also include instructions stored thereon, which when read and executed by one or more computer processors, cause the one or more computer processors to receive an indication from the client application that a user of the client application has been authenticated over the second secure connection and authenticate the session with the browser without further authentication.

BRIEF DESCRIPTION OF THE DRAWINGS

For a more complete understanding of the present invention, the objects and advantages thereof, reference is now made to the following descriptions taken in connection with the accompanying drawings in which:

FIG. 2 illustrates a method for mobile-mediated secure key exchange for general end-user connectivity according to an embodiment;

DETAILED DESCRIPTION OF PREFERRED EMBODIMENTS

Figure 1:
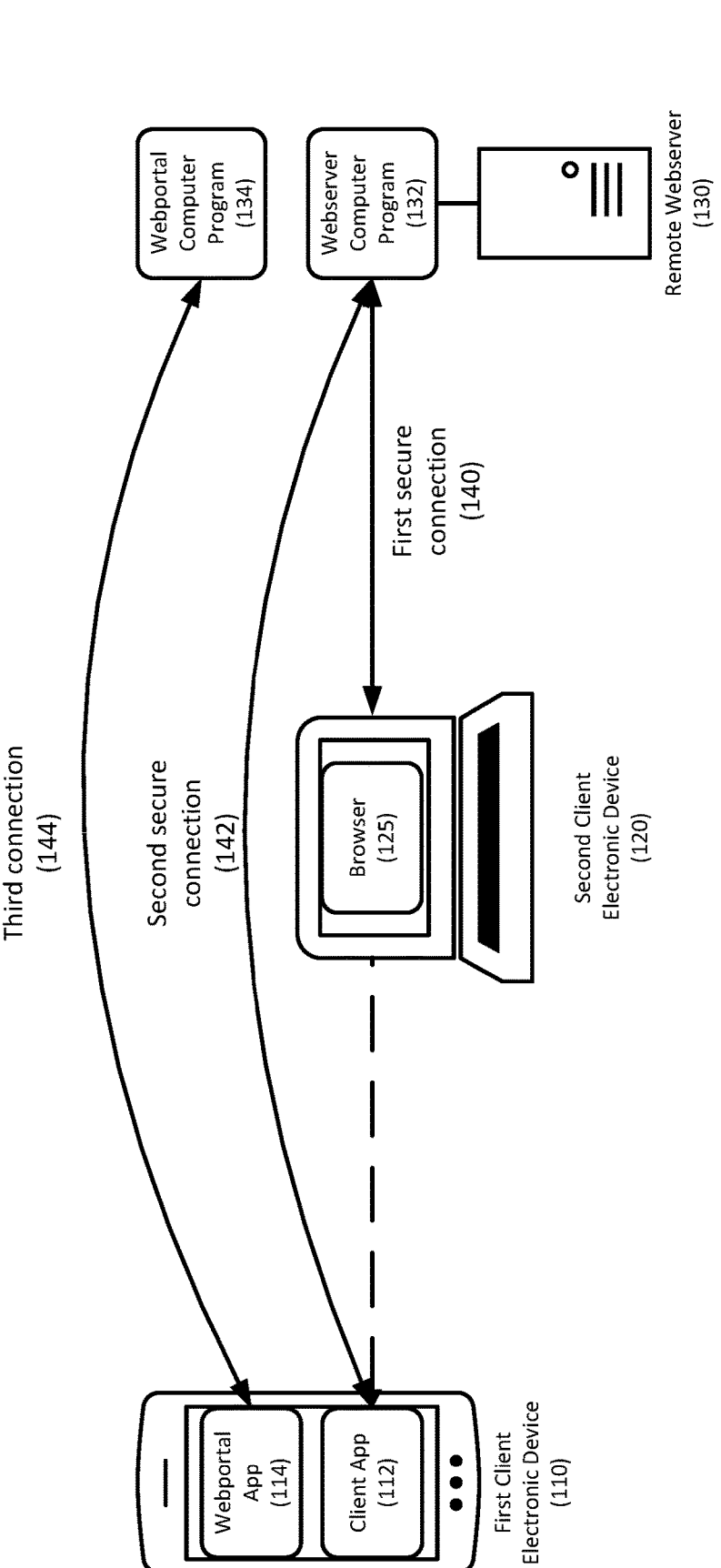
FIG. 1 illustrates a system for mobile-mediated secure key exchange for general end-user connectivity according to an embodiment.

Embodiments relate to systems and methods for mobile-mediated secure key exchange for general end-user connectivity.

Embodiments may allow a user in possession of a first electronic device that has successfully established key material with a remote webserver to leverage the device to establish a secure connection between a second electronic device and the webserver. For example, a mobile electronic device and a remote webserver may have pre-existing secure key material shared between them, enabling secure communication over authenticated communication channels (e.g., which may be achieved using standard digital signatures assuming sufficient refresh rates of the public key information and/or by using methods leveraging the pre-existing secure key material).

The second electronic device may make a call for a webpage to the remote webserver, which may serve the relevant webpage. Rather than transmit potentially sensitive information (including login information) to the webserver over the insecure connection, the loaded webpage instead directs the browser to generate a random symmetric key, to encode it into a machine-readable code (e.g., a QR code) along with session information, and to display the machine-readable code. Using the first electronic device, the user may receive the machine-readable code using a computer program or application, and may then use the pre-established secret key material to securely transmit the random symmetric key from the machine-readable code and the session information to the webserver.

The webserver may then use the session information to locate the corresponding connection with the second electronic device, and may use the transferred symmetric key to encrypt and decrypt communications with the second electronic device.

In one embodiment, the connection between the second electronic device and the remote webserver may be secured with standard public key methods.

In one embodiment, the symmetric key in the machine-readable code may be encrypted with a symmetric key generated as part of a public key handshake in order to foil potential attacks by computationally limited attackers that may have access to the machine-readable code (e.g. scan or otherwise intercept the machine-readable code).

In one embodiment, the entry of the machine-readable code may be implemented in an application that may be associated with an application or program executed on the webserver. For example, a user may enter login credentials (e.g., a username) into the webportal computer program via a browser on a first electronic device, and the webportal application on the second electronic device may then prompt the user to scan a machine-readable code (e.g., a QR code) presented in the browser.

In one embodiment, the application on the first electronic device may use its existing authentication with the webportal to assist the user in the login process of the second electronic device with the webserver without requiring further input from the user. In some embodiments, this may be enabled through some biometric authentication on the first electronic device.

Referring to FIG. 1, a system for mobile-mediated secure key exchange for general end-user connectivity is disclosed according to an embodiment. System 100 may include remote webserver 130, first client electronic device 110, and second client electronic device 120. Remote webserver 130 may be any suitable server, including physical and/or cloud-based server. Remote webserver 130 may execute webserver computer program 132. In one embodiment, remote webserver 130 may further execute webportal computer program 134, which may communicate with webportal application 114 executed by first client electronic device 110 that may correspond to webportal computer program 134. An example of such as a mobile banking application that may communicate with a banking website.

The communication between webportal app 114 and webportal computer program 134 may be over third connection 144. Third connection 144 may be an open or a secured communication channel.

Second client electronic device 120 may be any suitable electronic device, including computers (e.g., workstations, desktops, laptops, notebooks, laptops, tablets, etc.), smart devices (e.g., smart phones, smart watches, etc.), Internet of Things (IoT) devices, etc. Second client electronic device 120 may execute browser 125.

Browser 125 may communicate with webserver computer program over first secure connection 140.

First client electronic device 110 may be any suitable electronic device, including computers (e.g., laptops, notebooks, laptops, tablets, etc.), smart devices (e.g., smart phones, smart watches, etc.), Internet of Things (IoT) devices, etc. In one embodiment, first client electronic device 110 may be a mobile electronic device. First client electronic device 110 may execute client application 112, which may be a computer program, an application, etc.

First client electronic device 110 and webserver computer program 132 may maintain shared key material that has been securely shared, and may securely communicate with each other using the shared key materials.

In one embodiment, the key material may be any key material that has randomness with sufficient entropy for use in cryptographic protocols.

Client application 112 may communicate with webserver computer program 132 over any suitable communication channel, such as second secure connection 142. Second secure connection 142 may be secured with the shared key material.

In one embodiment, the functionality of webportal application 114 may be incorporated into client application 112.

Referring to FIG. 2, a method for mobile-mediated secure key exchange for general end-user connectivity is disclosed according to an embodiment.

In step 205, a client application executed by a first client electronic device and a webserver computer program executed by a remote webserver may securely receive shared key material.

In step 210, a computer application, such as a browser, executed by a second client electronic device may request a secure connection (e.g., a HTTPS connection) with the webserver computer application over a first connection.

In step 215, the webserver computer program may respond to the request, and in step 220, a secure connection between the browser and webserver may be established over the first connection.

In one embodiment, after the secure connection is established, session information for the session between the browser and the server may be communicated as part of the payload received by the browser over the secure connection.

In step 225, the browser and the webserver computer program may establish a shared secret key through classical key exchange. Examples of classical key exchange protocols include Elliptic-curve Diffie-Hellman (ECDH), RSA, CRYSTALS-Kyber, etc.

In step 230, the browser may create a browser secret key and may optionally encrypt the browser secret key with the shared secret key. In one embodiment, the session information may also be encrypted.

For example, the browser secret key may be a random string with sufficiently high entropy to be useful for cryptographic purposes, generated by the browser using, for example, cryptographic libraries, randomness libraries, or system level sources of randomness.

In step 235, the browser may encode the encrypted browser secret key and session information in a machine-readable code, and may make the machine-readable code available. For example, the machine-readable code may be a QR code or similar, and the browser may cause the second client electronic device to display the QR code on a display.

In another embodiment, the machine-readable code may be communicated by wireless communication (e.g., NFC, optical, audio, etc.).

In step 240, the client application executed by the first client electronic device may receive the machine-readable code. For example, the client application may capture an image of the QR code displayed by the second client electronic device, may receive a NFC communication, an audio communication, etc.

In step 245, the client application may extract the encrypted browser secret key and the session information from the machine-readable code.

In step 250, the client application may send the encrypted browser secret key and the session information to the webserver computer program over a second connection, such as a secure channel that is protected with the shared key material.

In one embodiment, if the client application has an existing login/authentication with the webserver computer program, such as by authentication using a webportal application using biometric or similar authentication, the client application may communicate an indication of such authentication to the webserver computer program with the browser secret key and session information. The webserver computer program may then authenticate the session with the browser without requiring further authentication.

In step 255, the webserver computer program may retrieve the encrypted browser secret key, and in step 260, may use the shared secret key to decrypt the browser secret key and session information.

In step 265, the webserver computer program may identify the session with the browser based on session information.

In step 270, the webserver computer program may acknowledge the receipt of browser secret key to the browser, and in step 275, the browser and webserver computer program may establish end-to-end encryption on top of the secure (e.g., HTTPS) connection. In one embodiment, the browser secret key, or a derivation thereof, may be used to provide the end-to-end encryption.

Figure 3:
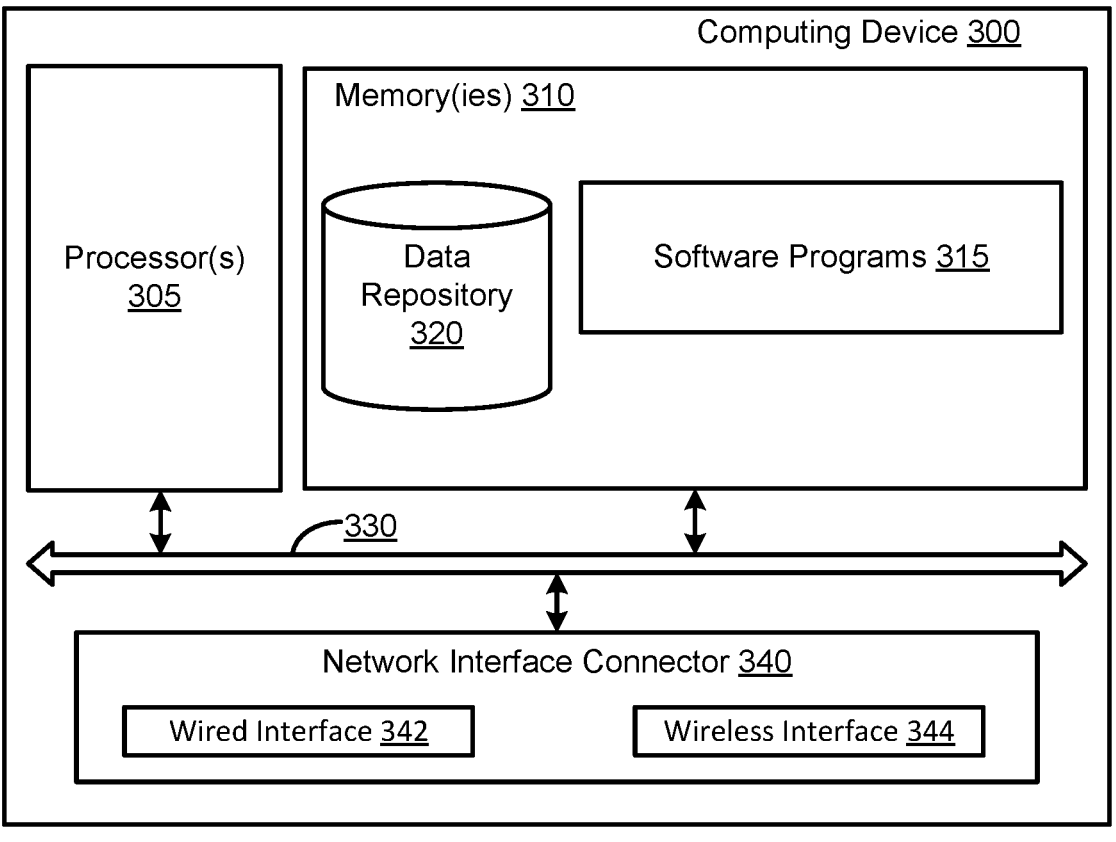
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for mobile-mediated secure key exchange, comprising:

receiving, by a webserver computer program executed by a remote webserver, shared key material, the shared key material shared with a client application executed by a first client electronic device;

receiving, by the webserver computer program and from a browser executed by a second electronic device, a request for a secure connection with the browser;

establishing, by the webserver computer program, a session with the browser over a first secure connection;

establishing, by the webserver computer program with the browser, a shared secret key, wherein the browser is configured to create a browser secret key encrypted with the shared secret key, encrypt the browser secret key with the shared secret key, and provide the browser secret key encrypted with the shared secret key and session information for the session to the client application over a second secure connection that is protected with the shared key material;

decrypting, by the webserver computer program, the browser secret key encrypted with the shared secret key using the shared secret key;

identifying, by the webserver computer program, the session with the browser from the session information; and establishing, by the webserver computer program and with the browser, end-to-end encryption on top of the second secure connection using the browser secret key or a derivation thereof.

2. The method of claim 1, wherein the shared secret key is established through classical key exchange.

3. The method of claim 1, wherein the browser is configured to encode the encrypted browser secret key in a machine-readable code.

4. The method of claim 3, wherein the machine-readable code is communicated optically, by radio frequency communication, or audibly.

5. The method of claim 1, wherein the session information received over the second secure connection is encrypted with the browser secret key, and the webserver computer program decrypts the session information with the browser secret key.

6. The method of claim 1, wherein the webserver computer program also receives an indication from the client application that a user of the client application has been authenticated over the second secure connection, and the webserver computer program authenticates the session with the browser without further authentication.

7. A system, comprising:

a first client electronic device executing a client application;

a second client electronic device executing a browser; and a remote webserver executing a webserver computer program;

wherein:

the webserver computer program and the client application are configured to receive shared key material;

the webserver computer program is configured to receive a request for a secure connection from the browser;

the webserver computer program is configured to establish a session with the browser over a first secure connection with the browser;

the webserver computer program and the browser are configured to establish a shared secret key;

the browser is configured to create a browser secret key encrypted with the shared secret key;

the browser is configured to encrypt the browser secret key with the shared secret key;

the browser is configured to provide the browser secret key encrypted with the shared secret key and session information for the session to the client application over a second secure connection that is protected with the shared key material;

the webserver computer program is configured to decrypt the browser secret key encrypted with the shared secret key using the shared secret key;

the webserver computer program is configured to identify the session with the browser from the session information; and the webserver computer program is configured to establish end-to-end encryption with the browser on top of the second secure connection using the browser secret key or a derivation thereof.

8. The system of claim 7, wherein the webserver computer program and the browser are configured to establish the shared secret key through classical key exchange.

9. The system of claim 7, wherein the browser is configured to encode the encrypted browser secret key in a machine-readable code.

10. The system of claim 9, wherein the machine-readable code is communicated optically, by radio frequency communication, or audibly.

11. The system of claim 7, wherein the browser is configured to encrypt the session information with the browser secret key, and the webserver computer program is configured to decrypt the session information with the browser secret key.

12. The system of claim 7, wherein the client application is configured to communicate, over the second secure connection, an indication that a user of the client application has been authenticated, and the webserver computer program is configured to authenticate the session with the browser without further authentication.

13. A non-transitory computer readable storage medium, including instructions stored thereon, which when read and executed by one or more computer processors, cause the one or more computer processors to perform steps comprising:

receiving shared key material, the shared key material shared with a client application executed by a first client electronic device;

receiving, from a browser executed by a second electronic device, a request for a secure connection with the browser;

establishing a session with the browser over a first secure connection with the browser;

establishing, with the browser, a shared secret key;

receive, from the client application, a browser secret key encrypted with the shared secret key and session information for the session over a second secure connection that is protected with the shared key material, wherein the browser secret key was encrypted with the shared secret key by the browser;

decrypting the browser secret key encrypted with the shared secret key using the shared secret key;

identifying the session with the browser from the session information; and establishing, with the browser, end-to-end encryption on top of the second secure connection using the browser secret key or a derivation thereof.

14. The non-transitory computer readable storage medium of claim 13, wherein the shared secret key is established through classical key exchange.

15. The non-transitory computer readable storage medium of claim 13, wherein the session information received over the second secure connection is encrypted with the browser secret key, and further including instructions stored thereon, which when read and executed by one or more computer processors, cause the one or more computer processors to decrypt the session information with the browser secret key.

16. The non-transitory computer readable storage medium of claim 13, further including instructions stored thereon, which when read and executed by one or more computer processors, cause the one or more computer processors to receive an indication from the client application that a user of the client application has been authenticated over the second secure connection and authenticate the session with the browser without further authentication.

* * * * *